United States Patent [19]

Takatani et al.

[11] 4,015,237
[45] Mar. 29, 1977

[54] VEHICLE ALARM SYSTEM

[75] Inventors: Masayoshi Takatani; Yuji Amaya, both of Kobe, Japan

[73] Assignee: Fujitsu Ten Ltd., Kobe, Japan

[22] Filed: June 16, 1976

[21] Appl. No.: 696,648

[30] Foreign Application Priority Data

June 18, 1975 Japan ............................ 50-74757

[52] U.S. Cl. ............................ 340/52 F; 340/414; 325/304; 325/312
[51] Int. Cl.² ........................................ G08B 19/00
[58] Field of Search ............ 340/52 F, 213 R, 412, 340/413, 414; 325/55, 57, 64, 117, 111, 304, 307, 312, 314

[56] References Cited

UNITED STATES PATENTS 3,949,358  4/1976  Higashi ............................ 340/52 F

*Primary Examiner*—Alvin H. Waring
*Attorney, Agent, or Firm*—Daniel Jay Tick

[57] ABSTRACT

A vehicle alarm system provides an audible alarm in the audio reproduction system of a vehicle when an abnormal condition is detected in an operating part of the vehicle. A sensor at each monitored operating part detects an abnormal condition occurring thereat and produces an abnormal condition signal when detecting such a condition. The abnormal condition signals from the sensors are supplied as inputs to an alarm signal supply circuit which produces alarm signals having different frequencies. A switching circuit switches the audio reproduction system from audio signals to an alarm signal upon the receipt of an abnormal condition signal from a sensor. The alarm signal supply circuit then supplies an alarm signal to the audio frequency amplifier of the audio reproduction system. When a plurality of sensors detect abnormal conditions simultaneously, a priority sequence judging circuit determines the degree of importance of each alarm signal and the priority sequence of the abnormal condition signals.

10 Claims, 5 Drawing Figures

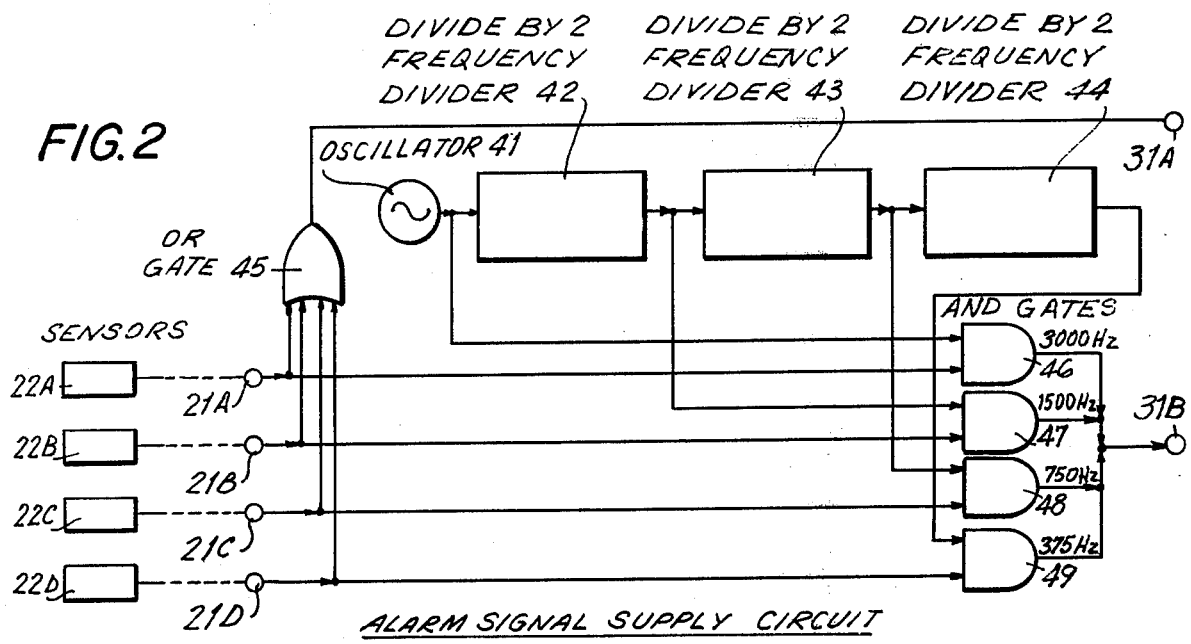
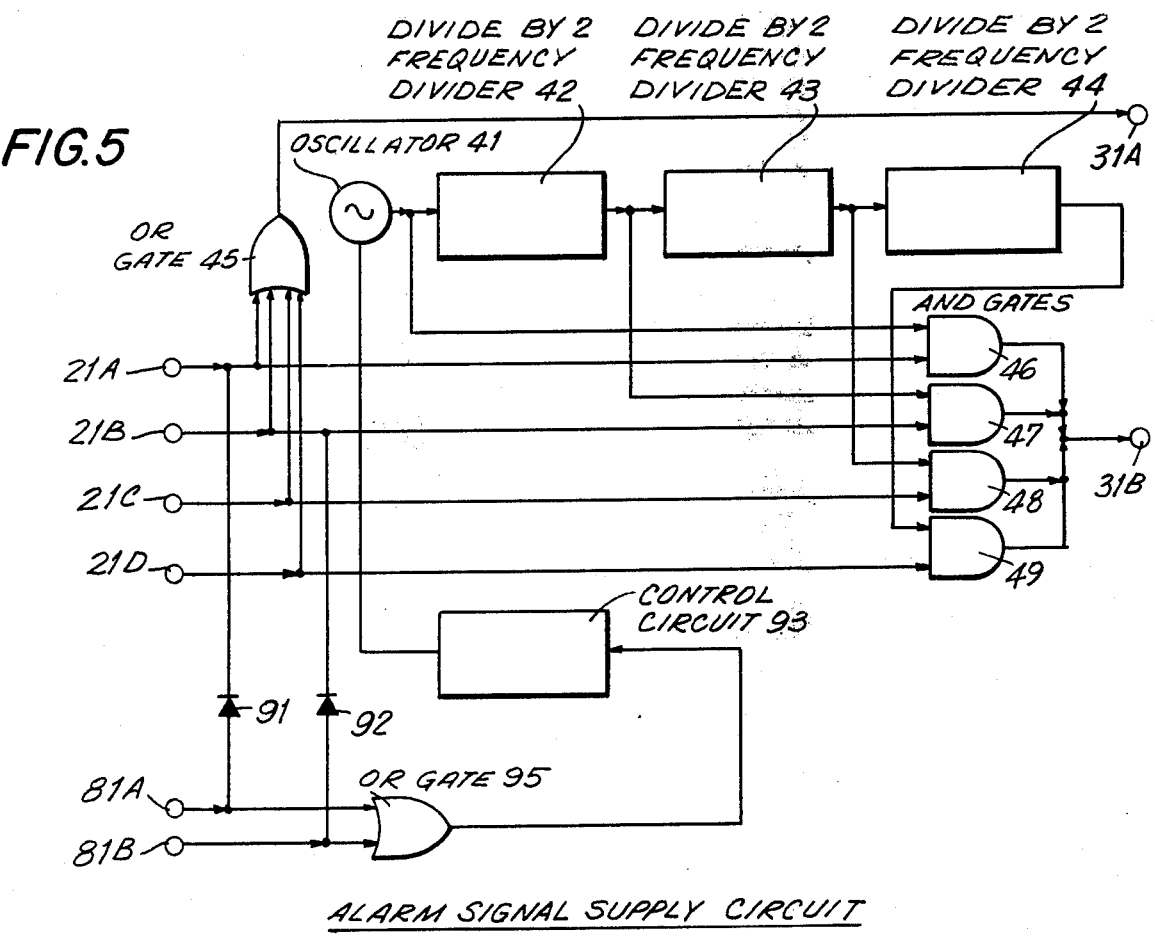

VEHICLE ALARM SYSTEM

BACKGROUND OF THE INVENTION

The present invention relates to a vehicle alarm system.

The vehicle alarm system of the invention produces an alarm for an abnormal condition of an operating part of a vehicle such as, for example, lowered tire pressure, shortage of engine oil, overheated cooling system fluid, and so on, by making use of the audio signal circuit of the audio reproduction system of the vehicle.

Recently, in vehicles such as, for example, automotive vehicles, if an abnormal condition which may be dangerous to life or property is detected in an operating part such as, for example, the lighting system, the engine system, the brake system, and so on, when starting or driving, an alarm system warns of such abnormal condition. The known alarm systems provide either a visual alarm via a lamp display or an audible alarm via a buzzer, or the like.

The known alarm systems have disadvantages. The visual alarm may escape the notice of the operator of the vehicle. The audible alarm makes it difficult for the operator of the vehicle to judge the type of abnormal condition detected, upon hearing the alarm, since the tone of alarm cannot be varied. Furthermore, installation of an audible alarm system is very complicated and expensive, if it is attempted to install different sound sources for each type of said abnormal condition.

The principal object of the invention is to provide a vehicle alarm system which produces alarm signals of different frequency tones in accordance with the sources of abnormal conditions.

An object of the invention is to provide a vehicle alarm system of simple structure which is inexpensive in manufacture and provides an alarm signal in the audio signal circuit of the audio reproduction system of the vehicle.

Another object of the invention is to provide a vehicle alarm system which selects a preferred one of a plurality of alarm signals when a plurality of abnormal condition signals are simultaneously received.

Still another object of the invention is to provide a vehicle alarm system which is of simple structure, inexpensive in manufacture and installed in new and existing vehicles with facility and convenience.

Yet another object of the invention is to provide a vehicle alarm system of simple structure, which functions efficiently, effectively and reliably to provide alarm signals, via the audio reproduction system of the invention, indicative of abnormal conditions in different operating parts of the vehicle.

BRIEF SUMMARY OF THE INVENTION

The vehicle alarm system of the invention comprises a switching circuit for controlling the supply of audio signals and alarm signals to the audio frequency amplifier of the audio reproduction system of a vehicle. An alarm signal supply circuit produces a plurality of alarm signals having different frequency components in accordance with the different operating parts having detected abnormal conditions.

In accordance with the invention, a vehicle alarm system for a vehicle having a plurality of operating parts, a plurality of sensors each monitoring a corresponding operating part and an audio reproduction system including an audio frequency amplifier, comprises a switching circuit for controlling the supply of audio signals to the audio frequency amplifier of the audio reproduction system of a vehicle. An alarm signal supply circuit is connected between the sensors and the audio reproduction system of the vehicle for producing an alarm signal when an abnormal condition is detected in an operating part of the vehicle by the corresponding one of the sensors. The switching circuit cuts off the supply of audio signals to the audio frequency amplifier and supplies an alarm signal to the audio frequency amplifier when a sensor provides an abnormal condition signal indicating the occurrence of an abnormal condition in an operating part.

The alarm signal supply circuit produces a plurality of alarm signals each having a frequency component different from those of the others. Each of the alarm signals of different frequency component represents a corresponding one of the operating parts and indicates an abnormal condition therein.

The alarm signal supply circuit has a plurality of inputs each connected to a corresponding one of the sensors for receiving abnormal condition signals from the sensors and an output connected to the audio frequency amplifier. The switching circuit includes a muting circuit connected in the audio reproduction system of the vehicle for muting audio signals supplied to the audio amplifier of the audio reproduction system when the muting circuit is energized and gate means connected to the muting circuit for energizing the muting circuit when an abnormal condition signal is supplied to an input of the alarm signal supply circuit.

The gate means of the switching circuit comprises an OR gate having a plurality of inputs each connected to a corresponding one of the inputs of the alarm signal supply circuit and an output connected to the muting circuit.

The alarm signal supply circuit comprises a plurality of inputs each connected to a corresponding one of the sensors for receiving abnormal condition signals from the sensors. An oscillator produces an audio frequency. A plurality of frequency dividers are connected to the oscillator for dividing the frequency produced by the oscillator. Gate means are connected to the frequency dividers and the inputs of the alarm signal supply circuit for selectively passing the output frequency of a corresponding one of the frequency dividers in accordance with the presence of an abnormal condition signal at an input of the alarm signal supply circuit.

The gate means of the alarm signal supply circuit comprises a plurality of AND gates each having a first input connected to a corresponding one of the frequency dividers, a second input connected to a corresponding input of the alarm signal supply circuit and an output connected in common with the outputs of the other AND gates to the audio frequency amplifier of the audio reproduction system of the vehicle whereby each of said AND gates passes the output frequency of a corresponding one of the frequency dividers under the control of an abnormal condition signal from a corresponding sensor.

A priority sequence judging circuit is connected in the alarm signal supply circuit for determining the degree of importance of an abnormal condition signal from a sensor at a monitored operating part of the vehicle and the priority sequence of abnormal condition signals.

The priority sequence judging circuit is connected between the inputs of the alarm signal supply circuit and the gate means of the alarm signal supply circuit.

The priority sequence judging circuit comprises a NOR gate which passes only a high priority abnormal condition signal from a sensor and blocks signals from the other sensors.

A control circuit is connected to the oscillator of the alarm signal supply circuit for intermittently controlling the operation of the oscillator. Additional gate means has inputs connected in common to selected ones of the inputs of the alarm signal supply circuit and the gate means of the alarm signal supply circuit and an output connected to the control circuit.

BRIEF DESCRIPTION OF THE DRAWINGS:

In order that the invention may be readily carried into effect, it will now be described with reference to the accompanying drawings, wherein:

FIG. 2 is a block diagram of an embodiment of the alarm signal supply circuit of the vehicle alarm system of the invention;

FIG. 5 is a block diagram of another embodiment of the alarm signal supply circuit of the vehicle alarm system of the invention.

In the FIGS., the same components are identified by the same reference numerals.

Figure 1:
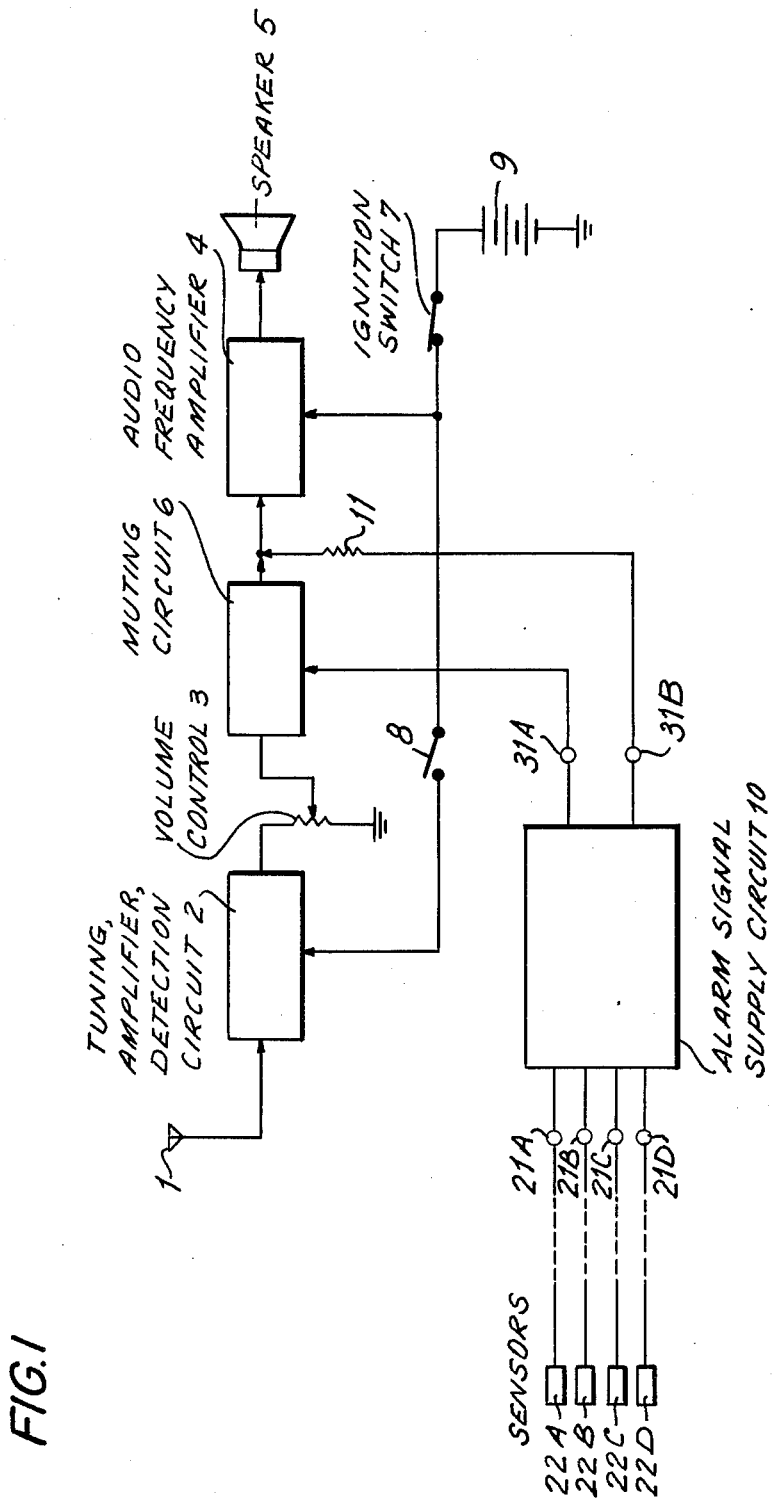
FIG. 1 is a block diagram of an embodiment of the vehicle alarm system of the invention.

DETAILED DESCRIPTION OF THE INVENTION:

As shown in FIG. 1, the vehicle alarm system of the invention uses a radio receiver of a vehicle as the audio reproduction system of such vehicle. The radio receiver, as is well known, has an audio signal path or circuit comprising an antenna 1, a tuning, amplifier, detection circuit 2, a volume control 3, an audio frequency amplifier 4 and a speaker 5. In accordance with the invention, a muting circuit 6 is provided in the audio signal circuit. The muting circuit 6 is connected between the volume control 3 and the audio frequency amplifier 4. The muting circuit 6 interrupts the audio signal input of the radio receiver when an abnormal detection signal is received, as hereinafter described, and is somewhat different from the muting circuit of an ordinary FM receiver in operation.

Although only one speaker 5 is shown in FIG. 1 for simplification, in a stereophonic system using two or four channels, all the speakers are utilized and issue the alarm tone simultaneously when an alarm signal is supplied to them in the manner hereinafter described. The ignition switch 7 is closer to the power supply source or battery 9 than is the power supply switch 8. The audio frequency amplifier 4 is in active condition as long as the ignition switch 7 is closed. The power supply switch 8 is for the tuning, amplifier, detection circuit 2 of the radio receiver and is closed only when the radio receiver is being utilized. The audio frequency amplifier 4 is thus energized as long as the ignition of the vehicle is on, regardless of whether or not the audio reproduction system of the vehicle is in use.

In accordance with the invention, an alarm signal supply circuit 10 is provided. A plurality of sensors 22A, 22B, 22C and 22D of known type are provided for a plurality of operating parts of the vehicle. Each sensor 22A to 22D monitors a corresponding operating part of the vehicle in a known manner. The alarm signal supply circuit 10 has input terminals 21A, 21B, 21C and 21D connected to the sensors 22A, 22B, 22C and 22D, respectively. Thus, abnormal condition signals produced by the sensors are received by the alarm signal supply circuit 10 via separate circuits or paths. Operating parts of the vehicle which are monitored by sensors include, for example, the tires, the brake system, the cooling system, the fuel system, lubricating oil, the lighting system, and so on. The monitoring sensor, when detecting an abnormal condition in the corresponding operating part, produces an abnormal condition signal.

When an operating part functions normally, the sensor closes, and a low level voltage is produced as a normal condition signal. When an abnormal condition occurs at an operating part, the sensor closes, and produces a high level voltage as an abnormal condition signal. The abnormal condition signal is then supplied to at least one of the input terminals 21A to 21D of the alarm signal supply circuit 10. The alarm signal supply circuit 10 then provides a trigger signal for the muting circuit 6 at the output terminal 31A and an alarm signal at the output terminal 31B. The alarm signal is supplied to the audio frequency amplifier 4 through a resistor 11.

The alarm signal supply circuit 10 of the vehicle alarm system of the invention is explained in detail with reference to FIG. 2. The alarm signal supply circuit comprises an oscillator 41. The oscillator 41 produces an output signal which is a comparatively high frequency signal of audio frequency, for example, the sine wave of 3000 Hz. The output of the oscillator 41 is connected to three divide by two frequency dividers 42, 43 and 44 in cascade connection. The output of the oscillator 41 is thus converted into ½, ¼ and ⅛ its frequency, that is, 1500 Hz, 750 Hz and 375 Hz, respectively, by the frequency dividers 42, 43 and 44, respectively. The four input terminals 21A to 21D are all connected to corresponding inputs of an OR gate 45 and are also connected to AND gates 46, 47, 48 and 49, respectively. The AND gates 46 to 49 are the first, second, third and fourth AND gates, respectively. The output terminal 31A is connected to the output of the OR gate 45 and the output terminal 31B is connected in common to the outputs of all the AND gates 46 to 49.

The signals having different frequencies are supplied to the other input of each of the AND gates 46 to 49. Thus, as shown in FIG. 2, the oscillator 41, which produces a sine wave of 3000 Hz, is connected to the other input of the AND gate 46, one input of which is connected to the input material 21A. The frequency divider 42, which produces an output frequency of 1500 Hz, is connected to the other input of the AND gate 47, one input of which is connected to the input terminal 21B. The frequency divider 43, which produces an output frequency of 750 Hz, is connected to the other input of the AND gate 48, one input of which is connected to the input terminal 21C. The frequency divider 44, which produces an output frequency of 375 Hz, is connected to the other input of the AND gate 49, one input of which is connected to the input terminal 21D.

The operation of the alarm system of the invention is explained by reference to FIGS. 1 and 2. When an abnormal condition occurs at an operating part of the vehicle, such as, for example, an abnormal condition indicating lowered tire pressure, such abnormal condition is detected by the corresponding sensor, which produces an abnormal condition signal of high level voltage. The abnormal condition signal is then supplied as input to the input terminal 21A of the alarm signal supply circuit 10. As a result, the OR gate 45 operates and provides an output. The output of the OR gate 45 is transmitted to the output terminal 31A and thence to the muting circuit 6, causing said muting circuit to interrupt the audio signal of the radio receiver.

On the other hand, the first AND gate 46, connected to the input terminal 21A, provides the output frequency of 3000 Hz from the oscillator 41 and such signal is supplied as input to the audio frequency amplifier 4 via the output terminal 31B and the resistor 11. The 3000 Hz frequency alarm signal is amplified by the audio frequency amplifier 4 and is issued from the speaker 5 as an alarm signal or tone. The electrical output signal of the oscillator or of a frequency divider, which results in an alarm tone is called the alarm signal.

The production of the alarm tone also result from the supply of input signals to the other input terminals 21B, 21C and 21D. When an abnormal condition signal is supplied to any of the terminals 21B, 21C or 21D, an alarm signal of determined frequency is supplied as an input to the audio frequency amplifier 4, and the speaker 5 produces an alarm tone having a pitch corresponding to the respective alarm signal. The operator of the vehicle can distinguish the type of abnormal condition warned of by the difference in the pitch of the alarm tone, without relinquishing or diminishing his full attention to operating the vehicle.

Figure 3:
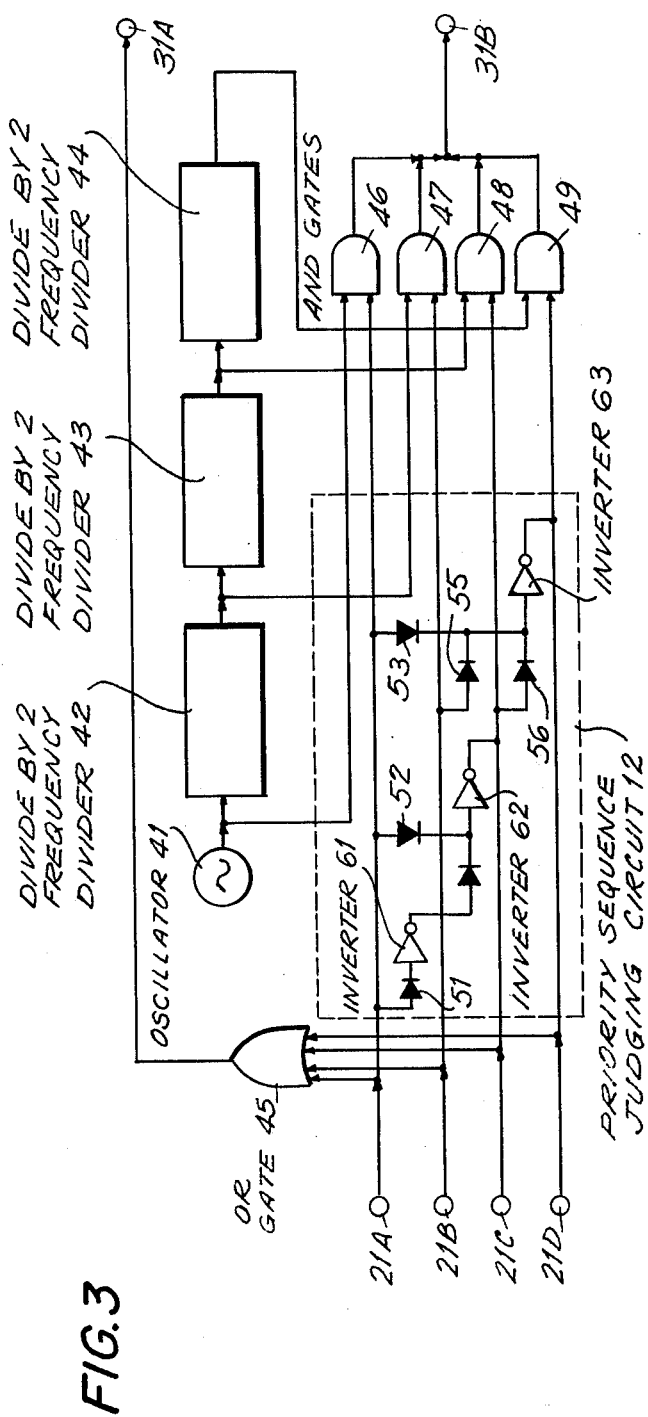
FIG. 3 is a block diagram of the embodiment of the alarm signal supply circuit of FIG. 2 and a circuit diagram of an embodiment of the priority sequence judging circuit included therewith.

When two types of abnormal conditions are detected, that is, when abnormal conditions are detected at two different operating parts of the vehicle, two different signals are simultaneously supplied to the input terminals of the alarm signal supply circuit. Alarm signals having frequencies corresponding to the respective input terminals are simultaneously supplied as input to the audio frequency amplifier 4. Thus, a mixed tone consisting of several types of simple tone having different pitches issues from the speaker 5. This sound therefore differs from the simple single tone sound. However, the operator of the vehicle can identify each mixed alarm tone, when he becomes familiar with such a mixed tone. For the purposes of the invention, however, it would be better not to set the frequency ratio of the alarm signals from the different terminals to $2^n$, where $n$ is an integer. If the discordance is great, a very uncomfortable tone issues from the speaker when several alarm signals of different frequencies are supplied to the audio frequency amplifier. The operator may thereby immediately detect the occurrence of serious conditions. When two or more alarm tones are produced simultaneously, however, it becomes very difficult to identify the type of abnormal condition, and in some cases identification becomes impossible. The invention solves this problem, and includes a priority sequence judging circuit 12, as shown in FIG. 3. The priority sequence judging circuit 12 preferentially selects only one alarm signal, according to a priority sequence, from several alarm signals.

As shown in FIG. 3, the priority sequence judging circuit 12 is connected between the input terminals 21A to 21D and the AND gates 46 to 49 of the alarm signal supply circuit. The priority sequence judging circuit 12 comprises five diodes 51 to 56 and three inverters 61 to 63. In the embodiment of FIG. 3, the priority of the alarm signal circuit or path is determined in the sequence of the input terminal 21A, then 21B, 21C and 21D. For this reason, the series circuit of the diode 51 and the inverter 61 and the series circuit of the diode 52 and the inverter 63 are connected between the input terminal 21A and the input terminals 21C and 21D, respectively. Similarly, the series circuit of the diode 54 and the inverter 62 and the series circuit of the diode 55 and the inverter 63 are connected between the input terminal 21B and the other input terminals 21C and 21D, respectively. The series circuit of the diode 56 and the inverter 63 is connected between the input terminals 21C and 21D. The inverters 62 and 63 are used in common.

The priority sequence judging circuit 12 is a logic circuit which makes a higher priority signal an inhibit signal. In other words, the priority sequence judging circuit 12 is a NOR gate which permits an input of a signal from a terminal of higher priority. When a conventional integrated circuit is used as the inverter of the priority sequence judging circuit, the circuit design is very simple. An ordinary transistor circuit may be used as the inverter.

Figure 4:
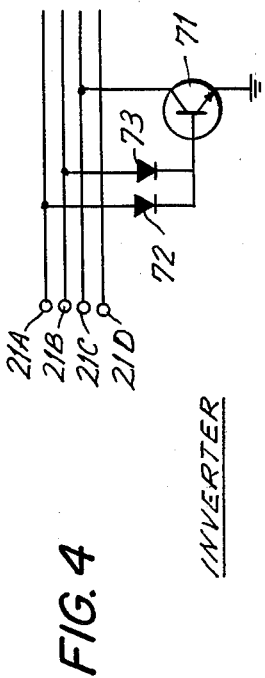
FIG. 4 is a circuit diagram of an embodiment of an inverter of the priority sequence judging circuit of FIG. 3.

FIG. 4 shows a transistorized inverter which may be used as the inverter of the priority sequence judging circuit 12. In FIG. 4, a transistor 71 has a base electrode coupled to the input terminal 21A of the alarm signal supply circuit via a diode 72, a collector electrode coupled to the input terminal 21B via a diode 73 and an emitter electrode connected to a point at ground potential. The transistor 71 is an NPN type transistor. The diodes 72 and 73 correspond to the diodes 52 and 54, respectively. When an input signal is supplied to either of the input terminals 21A and 21B, the transistor 71 becomes conductive or ON, and a signal input to the terminal 21C is dissipated by grounding.

The priority sequence judging circuit 12 operates as follows. If two types of abnormal conditions are indicated by signals received at the input terminals 21A and 21C, for example, of the alarm signal supply circuit, said terminals have high level signals thereat. Thus, an output is provided at the OR gate 45. This results in the muting circuit 6 cutting off the audio signal of the radio receiver. Simultaneously, one input of each of the AND gates 46 and 48 has a high level signal supplied thereto due to high level signals of the input terminals 21A and 21C. However, the input terminal 21C is forcibly maintained at a low level signal by the inverter 62. More particularly, the inverter 62 inverts the output via the diode 52 due to a high level of the input terminal 21A to a low level. The other inverters 61 and 63 are also inverted to low levels. The input terminal 21C is thereby set to a low level, or ground potential, via the inverter 62. As a result, the third AND gate 48 remains non-conductive, and only the first AND gate 46 is conductive and passes the 3000 Hz output of the oscillator 41. The speaker 5 thus issues an alarm tone, as hereinbefore mentioned.

Thus, the abnormal condition indicated at the input terminal 21A is preferentially routed. This is also true when an abnormal condition signal is applied to all the other input terminals. As long as the signal at the input terminal 21A is at a high level, other alarm signals are forcibly suppressed by the inverters 61 to 63. When an alarm signal of higher priority ceases, due to repair of the operating part, or for other reasons, an alarm signal indicating an abnormal condition in the next higher priority is initiated. The operator of the vehicle can thus always hear only one type of alarm tone representing the abnormal condition of an operating part and can readily identify the type of abnormal condition pertaining. Furthermore, the alarm signals are provided in accordance with a priority sequence, so that the abnormal conditions of the operating parts may be treated in the same sequence of priority.

In the aforedescribed example of operation of the priority sequence judging circuit, a single frequency sine wave is used as the alarm signal. The alarm signal of the invention is not limited in waveform to a sine wave, however. Various types of waveforms may be utilized as the alarm signal. Thus, for example, the alarm signal may comprise an intermittently modulated or frequency modulated sine wave. This type of alarm signal considerably increases the notice thereof and the attention thereto of the operator of the vehicle.

An embodiment of the vehicle alarm system of the invention utilizing an intermittently modulated alarm signal is described with reference to FIG. 5. As in the described embodiment of the invention, the oscillator 41 of FIG. 5 has a frequency of oscillation of 3000 Hz and is controlled by voltage applied from the external circuit. In the embodiment of FIG. 5, input terminals 81A and 81B are coupled to the input terminals 21A and 21B of the alarm signal supply circuit via diodes 91 and 92, respectively.

when an abnormal condition signal is supplied to the input terminals 81A and 81B, alarm signals of 3000 Hz and 1500 Hz are provided in succession at the output terminal 31B, as when an abnormal condition signal is supplied to the input terminals 21A and 21B, respectively. A control circuit 93 controls the alarm signal provided at the output terminal 31B so that it becomes an intermittent waveform. More particularly, the oscillator 41 stops oscillating when there is an input of a negative voltage from the outside, but oscillates when there is no input of a negative voltage from the outside. On the other hand, the control circuit 93 produces a negative square wave having a very low repetition frequency such as, for example, 1Hz, during the application of an external voltage.

Under the aforedescribed condition, while an abnormal condition signal is being supplied to at least one of the input terminals 81A and 81B, for example, to the input terminal 81A, such signal passes an OR gate 95 to the control circuit 93 and said control circuit produces the aforedescribed square wave.

The square wave output of the control circuit 93 controls the oscillator 41 by causing it to oscillate intermittently at the aforementioned repetition frequency. Therefore, since the speaker 5 intermittently issues a tone of 3000 Hz, said tone is clearly distinguished from the case when an abnormal condition signal is supplied to the input terminal 21A. If an abnormal condition signal is supplied to the input terminal 81B, the speaker 5 intermittently issues a tone of 1500 Hz.

The addition of other input terminals 81C and 81D and other diodes for said input terminals, in FIG. 5, permits the production of intermittent tones of 750 Hz and 375 Hz. Furthermore, if a voltage controlled oscillator is utilized as the oscillator 41, the oscillation frequency can be modulated according to the control voltage waveform impressed externally. This enables the speaker 5 to issue various tones.

In the foregoing description, the radio receiver of the vehicle is used as the audio reproduction system of said vehicle. However, it is also possible to use the audio frequency amplifier and speaker of a magnetic tape recording or sound reproduction system or the audio frequency amplifier and speaker of a television receiver, since the signal output circuit or path of such systems and receiver is substantially the same as that of a radio receiver. Furthermore, the abnormal condition signal need not be limited to one produced only in the vehicle. The abnormal condition signal may be a radio signal transmitted from outside the vehicle, but received by a receiver in the vehicle, demodulated, and utilized. Thus, when it is desired to caution the operator of a vehicle of traffic restrictions in a specific area, for example, radio signals may be transmitted to the vehicle upon violations of traffic regulations such as speeding, wrong direction turns, and so on, to operate the alarm signal supply circuit in the same manner as abnormal condition signals. This would warn the operator of such violations.

As is obvious from the foregoing explanation, the vehicle alarm system of the invention causes the speaker of the audio reproduction system of a vehicle, such as, for example, the radio receiver of the vehicle to selectively issue a large variety of alarm tones via the audio signal circuit or path of such audio reproduction system. The vehicle alarm system of the invention thus eliminates the need for separate or several sound sources and functions as a very simple and economical alarm system. Furthermore, the vehicle alarm system of the invention attracts the attention of the operator in accordance with the degree of danger due to abnormality in the function by issuing not so uncomfortable tone or sound, an intermittent tone or sound which attracts the attention of the operator, or an unbearable unharmonious sound or tone.

Furthermore, the vehicle alarm system of the invention provides the excellent feature or advantage of clear identification of an abnormal condition even when two more abnormal conditions occur simultaneously. This is due to the selection of only one abnormal condition signal of higher priority for producing the alarm signal which results in the issuance of the alarm tone by the speaker.

While the invention has been described by means of specific examples and in specific embodiments, we do not wish to be limited thereto, for obvious modifications will occur to those skilled in the art without departing from the spirit and scope of the invention.

We claim:

1. A vehicle alarm system for a vehicle having a plurality of operating parts, a plurality of sensors each monitoring a corresponding operating part and an audio reproduction system including an audio frequency amplifier, said vehicle alarm system comprising
a switching circuit for controlling the supply of audio signals to the audio frequency amplifier of the audio reproduction system of a vehicle; and
an alarm signal supply circuit connected between the sensors and the audio reproduction system of the vehicle for producing an alarm signal when an abnormal condition is detected in an operating part of the vehicle by the corresponding one of the sensors, said switching circuit cutting off the supply of audio signals to the audio frequency amplifier and supplying an alarm signal to said audio frequency amplifier when a sensor provides an abnormal condition signal indicating the occurrence of an abnormal condition in an operating part.

2. A vehicle alarm system as claimed in claim 1, wherein said alarm signal supply circuit produces a plurality of alarm signals each having a frequency component different from those of the others, each of the alarm signals of different frequency component representing a corresponding one of the operating parts and indicating an abnormal condition therein.

3. A vehicle alarm system as claimed in claim 1, wherein the alarm signal supply circuit has a plurality of inputs each connected to a corresponding one of the sensors for receiving abnormal condition signals from the sensors and an output connected to the audio frequency amplifier, and the switching circuit includes a muting circuit connected in the audio reproduction system of the vehicle for muting audio signals supplied to the audio amplifier of said audio reproduction system when the muting circuit is energized and gate means connected to the muting circuit for energizing said muting circuit when an abnormal condition signal is supplied to an input of the alarm signal supply circuit.

4. A vehicle alarm system as claimed in claim 1, wherein the alarm signal supply circuit comprises a plurality of inputs each connected to a corresponding one of the sensors for receiving abnormal condition signals from the sensors, an oscillator producing an audio frequency, a plurality of frequency dividers connected to the oscillator for dividing the frequency produced by the oscillator, and gate means connected to the frequency dividers and the inputs of the alarm signal supply circuit for selectively passing the output frequency of a corresponding one of the frequency dividers in accordance with the presence of an abnormal condition signal at an input of said alarm signal supply circuit.

5. A vehicle alarm system as claimed in claim 1, further comprising a priority sequence judging circuit connected in the alarm signal supply circuit for determining the degree of importance of an abnormal condition signal from a sensor at a monitored operating part of the vehicle and the priority sequence of abnormal condition signals.

6. A vehicle alarm system as claimed in claim 3, wherein the gate means of the switching circuit comprises an OR gate having a plurality of inputs each connected to a corresponding one of the inputs of the alarm signal supply circuit and an output connected to the muting circuit.

7. A vehicle alarm system as claimed in claim 4, wherein the gate means of the alarm signal supply circuit comprises a plurality of AND gates each having a first input connected to a corresponding one of the frequency dividers, a second input connected to a corresponding input of the alarm signal supply circuit and an output connected in common with the outputs of the other AND gates to the audio frequency amplifier of the audio reproduction system of the vehicle whereby each of said AND gates passes the output frequency of a corresponding one of the frequency dividers under the control of an abnormal condition signal from a corresponding sensor.

8. A vehicle alarm system as claimed in claim 4, further comprising a priority sequence judging circuit connected between the inputs of the alarm signal supply circuit and the gate means of said alarm signal supply circuit.

9. A vehicle alarm system as claimed in claim 4, further comprising a control circuit connected to the oscillator of the alarm signal supply circuit for intermittently controlling the operation of said oscillator, and additional gate means having inpus connected in common to selected ones of the inputs of the alarm signal supply circuit and the gate means of said alarm signal supply circuit and an output connected to the control circuit.

10. A vehicle alarm system as claimed in claim 5, wherein the priority sequence judging circuit comprises a NOR gate which passes only a high priority abnormal condition signal from a sensor and blocks signals from the other sensors.

* * * * *